United States Patent Office 3,838,119
Patented Sept. 24, 1974

3,838,119
10a-PHENYL - 7a,10a - DIHYDROFURANO[2',3':4,5]
THIAZOLO[2,3-c][1,2,4]BENZOTHIADIAZIN-9(8H)-
ONE-5,5-DIOXIDE AND DERIVATIVES THEREOF
Peter H. L. Wei, Springfield, and Stanley C. Bel, Penn
Valley, Pa., assignors to American Home Products
Corporation, New York, N.Y.
No Drawing. Filed Mar. 30, 1973, Ser. No. 346,494
Int. Cl. C07d 93/32
U.S. Cl. 260—243 R           2 Claims

ABSTRACT OF THE DISCLOSURE

Compounds of the formula:

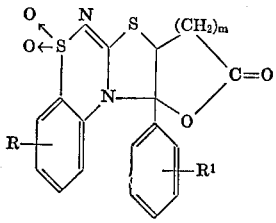

wherein R and R[1] are, independently, hydrogen, lower alkyl, halogen, nitro, trifluoromethyl, or lower alkoxy; and m is 1 or 2; have CNS depressant activity.

---

The invention sought to be patented comprises chemical compounds having the structural formula:

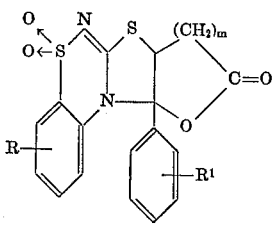

wherein R and R[1] are, independently, hydrogen, lower alkyl, halogen, nitro, trifluoromethyl, or lower alkoxy; and m is 1 or 2.

As used herein the term "lower alkyl" or "lower alkoxy" means a substituent having an alkyl moiety of from one to four carbons. The term "halogen" means a chloro, bromo, or iodo substituent.

The compounds of Formula I, where R and m are as hereinbefore defined, exert a depressant action on the central nervous system as demonstrated by evaluation in standard pharmacologic test procedures.

The compounds of Formula I are prepared in two steps. First, a compound of Formula II:

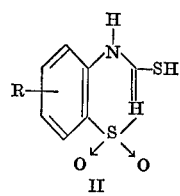

wherein R is a hydrogen, lower alkyl, halogen, nitro, trifluoromethyl, or lower alkoxy; is treated with a compound of Formula III:

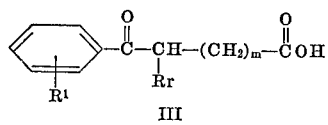

wherein R[1] is hydrogen, lower alkyl, halogen, nitro, trifluoromethyl, or lower alkoxy and m is 1 or 2; to give an intermediate compound of Formula IV:

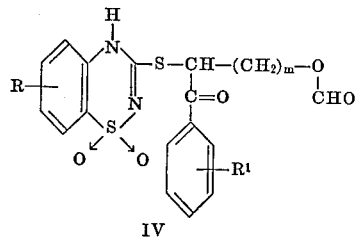

wherein R and R[1] have the above-defined meanings. The intermediate IV is then cyclized to give the final product. The first reaction is carried out in aqueous alkali, preferably aqueous potassium hydroxide. The intermediate acid (IV) is obtained by acidification of the salt which is initially formed. The cyclization is effected by heating the intermediate acid (IV) in acetic anhydride.

The starting materials employed in the aforedescribed method of preparation are either known compounds or can be prepared from known compounds by conventional methods.

When the compounds of the invention are employed pharmacologically, they may be administered alone or in combination with pharmaceutically acceptable carriers, the proportion of which is determinied by the solubility and chemical nature of the compound, chosen route of administration, and standard pharmaceutical practice. For example, they may be administered orally in the form of tablets or capsules containing such excipients as starch, lactose, magnesium stearate, and so forth. They may be administered orally in the form of solution or they may be injected parenterally, e.g. intramuscularly. For parenteral administration, they may be used in the form of a steril solution or suspensions containing other solutes, for example, enough saline to glucose to make the solution isotonic.

The dosage of the present pharmacologically active agents will vary with the form of administration and the particular compound chosen. Furthermore, it will vary with the particular subject under treatment. Generally, treatment is intiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a dosage level that will generally afford effective results without causing any harmful or deleterious side effects.

The manner and process for making and using the invention are illustrated in the following examples, where all temperature are given in degrees Centigrade.

EXAMPLE I 3-(p-Chlorobenzoyl)-3-(6-Chloro-4H-1,2,4-Benzothiadi-
azin-3-Ylthio)Propionic Acid 5,5-Dioxide To an aqueous solution of 7-chloro-2-mercapto-1,2,4-benzothiadiazine 5,5-dioxide (5.3 g., 0.0216 m.) and potassium hydroxide (3.8 g., 0.067 m.) is added 3-bromo-3-(p-chlorobenzoyl)propionic acid (6.6 g., 0.0226 m.). The solution is stirred at room temperature for four hours and then allowed to stand overnight. After filtering, the filtrate is acidified with a 6N hydrochloric acid solution. The solid material is collected and dried. Weight 8.0 g. The crude material is dissolved in hot dimethoxyethane, filtered and concentrated. The residue is treated with benzene and collected to give the title compound, m.p. 237–239°.

*Analysis.*—Calculated for: $C_{17}H_{12}Cl_2N_2O_5S_2$: C, 44.45; H, 2.63; Cl, 15.44; N, 6.10; S, 13.96. Found: C, 44.44; H, 2.84; Cl, 15.46; N, 6.25; S, 14.23.

The IR spectrum shows absorptions for NH at 3.1μ, $CO_2H$ at 5.85μ, keto 5.95μ, $SO_2N$ at 7.7μ and 8.3μ.

EXAMPLE II

2-Chloro-10a(*p* - Chlorophenyl - 7a,10a - Dihydrofurano [2′,3′:4,5]Thiazolo[2,3 - *c*][1,2,4]Benzothiadiazin - 9- (8H)-One-5,5-Dioxide A solution of acetic anhydride (50 ml.) and 3-(*p*-chlorobenzoyl) - 3 - (6 - chloro-4H-1,2,4-benzothiadiazin-3-ylthio)propionic acid (7.4 g.) is heated to reflux for 16 hours. The solid is collected. Weight, 5.7 g. The crude material is recrystallized from dimethoxyethane to give 5.0 g. of the title compound, m.p. 295–300°.

*Analysis.*—Calculated for: $C_{17}H_{10}Cl_2O_4S_2$: C, 46.27; H, 2.28; Cl, 16.07; N, 6.35. Found: C, 46.34; H, 2.23; Cl, 16.05; N, 6.36.

IR (KBr): γ-lactone, 5.5μ; aromatic, 6.25μ; $SO_2N$, 7.6 and 8.5μ. NMR (DMSO): δ 7.6 (*m*, 7, aromatic); 4.58 (*t*, *l*, J=8Hq, methine); 3.40 (*m*, 2, $COCH_2C$).

EXAMPLE III

The CNS-depressant effects of the compounds of Formula I are elicited and demonstrated by the following test procedure:

A compound of Formula I is administered orally (P.O.) or intraperitoneally (I.P.) to each of three mice. The animals are observed for signs of CNS-depressant activity, such as decreased motor activity, sedation, ataxia, loss or righting reflex, and decreased respiration. When tested as above-described 2-chloro-10a-(*p*-chlorophenyl-7a,10a - dihydrofurano[2′,3′:4,5]thiazole[2,3 - *c*][1,2,4] benzothiadiazin-9(8H)-one-5,5-dioxide showed decreased motor activity and decreased respiration at 127 mg./kg. (I.P.).

What is claimed is:

1. A compound of the formula:

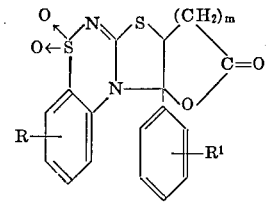

wherein R and $R^1$ are, independently, hydrogen, lower alkyl, halogen, nitro, trifluoromethyl, or lower alkoxy; *m* is 1 or 2.

2. The compound as defined in Claim 1 which is: 2 - chloro - 10a - (*p*-chlorophenyl-7a,10a-dihydrofurano-[2′,3′:4,5] thiazolo [2,3 - *c*] [1,2,4] benzothiadiazin - 9- (8H)-one-5,5-dioxide.

References Cited

UNITED STATES PATENTS 3,755,312    8/1973    Anderson et al. _____ 260—243

JOHN M. FORD, Primary Examiner

U.S. Cl. X.R.

424—246